United States Patent Office 2,828,589
Patented Apr. 1, 1958

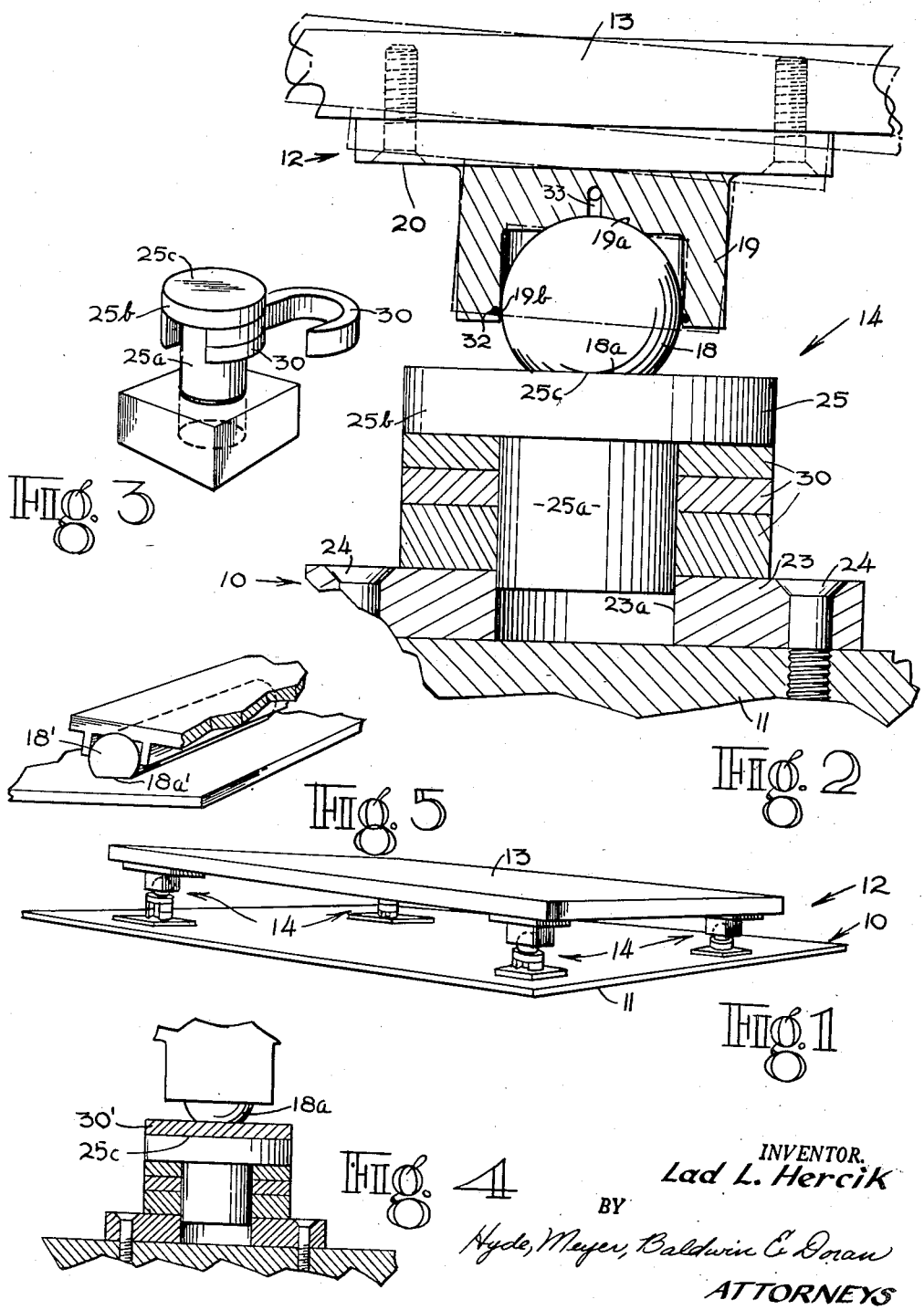

2,828,589

WORK TABLE SUPPORT

Lad L. Hercik, Lakewood, Ohio

Application May 28, 1954, Serial No. 433,126

20 Claims. (Cl. 51—240)

This invention relates to improvements in a support and more particularly to a support for a work table.

One of the objects of the present invention is to provide an apparatus for angularly aligning two members relative to each other wherein said apparatus is capable of forming compound angles therebetween.

Another object of the present invention is to provide an apparatus for accurately providing any desired angular alignment with this apparatus retaining its accuracy under heavy loads.

Another object of the present invention is to provide an apparatus for angularly aligning parts of a jig, fixture, work table, gauging device, grinding table fixture, etc.

Another object of the present invention is to provide an apparatus of any of the aforementioned types characterized by its structural simplicity, ease of adjustment, long accuracy life, ease of assembly, strong and sturdy nature, and economy of manufacture.

Other features of this invention reside in the arrangement and design of the parts for carrying out their appropriate functions.

Other objects and advantages of this invention will be apparent from the accompanying drawings and the description and the essential features will be set forth in the appended claims.

In the drawings,

Fig. 1 is a perspective view of two members angularly aligned with respect to each other on a compound angle;

Fig. 2 is a longitudinal, enlarged sectional view through one of the adjustable support means between said members with the upper member shown in solid line and dot-dash positions;

Fig. 3 is a perspective view of the lower portion of the support means in Fig. 2 with one of the height spacers partially withdrawn therefrom;

Fig. 4 is a view of the support means in Fig. 2 having a modified form of adjustable height support means therein; while Fig. 5 is a perspective view of a modified type of support means.

This invention in one of its broader aspects relates to an apparatus for angularly aligning two members relative to each other wherein these members may take the forms of two different parts of a fixture, work table, gauging device, etc. However, these members are specifically here shown as two parts of a grinding table fixture. This invention more specifically relates to the universal support, taking the form of a ball and socket joint, between these members.

In the illustrated grinding machine set-up in Fig. 1, a lower member, generally shown at 10, includes a table 11 fastening to or forming a grinding table while an upper member, generally shown at 12, includes a plate 13 fastening to or forming a fixture plate on which the work piece is supported while several support means, each generally shown at 14, are formed between these members and space them apart. Vertical adjustment in the respective support means 14 give variation in angular alignment between table 11 and plate 13. When the desired angular alignment is obtained by selection of proper spacers, clamps may be provided to hold the fixture plate 13 in this accurate angular alignment against the forces caused by machining or grinding the work piece. However, the present invention is primarily concerned with the construction of this support means for giving accurate angular alignment between the members 10 and 12.

Since all four of the support means illustrated in Fig. 1 are similar in construction, only one will be described and this is more specifically shown in Figs. 2 and 3.

The upper portion of the support means in Fig. 2 comprises a holder 19 secured by screws 20 or any other suitable means to the bottom surface of the fixture plate 13. In this holder 19 is detachably secured a support element taking the form of a generally spherical ball 18, circular in cross-section, with a ground flat surface 18a on the bottom side thereof adapted to bear against a flat surface on the top of the lower member 10. This generally spherical ball 18 is detachably held in a downwardly extending socket 19a in holder 19 with this socket receiving and conforming at least partially to the spherical surface of the ball with the ground flat surface 18a on the ball being located remote from the interior of the socket.

A portion of the lower member 10 forms the lower portion of the support means 14 by having a post socket 23 secured to the table 11 by screws 24 or any other suitable securing means. A mushroom shaped pin 25 has an enlarged cylindrical head 25b integrally connected to a downwardly extending cylindrical shank 25a telescoped into a cylindrical bore 23a formed in the body portion of post socket 23. A flat surface 25c is formed on the top of the enlarged head 25b to provide the flat surface on the top of lower member 10 that bears against the flat surface 18a on the generally spherical ball 18.

A simple or compound angle can be formed between table 11 and plate 13 in Fig. 1 by changing the height of one or more of the support means 14 therebetween. This height adjustment is provided at each support means by spacer means for selective insertion or removal between the generally spherical ball 18 and the major portion of the lower member 10 so as to change the vertical distance between table 11 and plate 13.

In Figs. 2 and 3, the spacer means takes the form of one or more generally horseshoe shaped members 30 selectively insertable over or removable from the shank 25a of pin 25 to change the spacing between the enlarged head 25b and the body portion formed by the post socket 23. The telescopic connection between the shank 25a and the socket bore 23a permits relative movement between the flat surface 25c and the major portion of the lower member 10 formed by the table 11 so that the spacer members 30 may be inserted or removed therebetween.

In the modified form of the invention in Fig. 4, one or more spacer members 30' are insertable or removable from between the flat surfaces 18a and 25c to cause a similar variation in height in the supporting means. Spacer members 30' may be used either alone or with spacer members 30.

It should now be readily apparent that plate 13 may be quickly and readily adjusted to any desired angle with respect to table 11, and this angle may take the form of either a simple angle or compound angle. A simple angle is tapered only in one direction while a compound angle is tapered in two different directions or in two different planes mutually perpendicular to each other and to the surface of table 11. A satisfactory compound angle can be formed when either three or four or more nonlinear support means 14 are provided.

The generally spherical balls 18 form, with their holders 19, ball and socket joints so as to permit the fixture plate 13 to adjust itself to various angles while the flattened surface 18a on the ball always gives a good flat contact on flat surface 25c of the lower member 10. These spherical balls 18 are self-accommodating to the angular orientation between the members 10 and 12.

No brinelling or denting will take place between the conforming flat surfaces 18a and 25c since these abutting flat surfaces are capable of absorbing substantial load without deformation. It has been found that when spherical balls are used on a flat surface 25c without having flattened surfaces 18a on the balls, either the spherical surfaces of the balls flatten or the flat way surface becomes brinelled, that is, pit-marked, and the surfaces must be reground because their accuracy is lost. This is especially true when heavy loads are imposed on the support means 14 such as in a grinding or machining fixture. Providing a flattened surface 18a on the generally spherical ball 18 has eliminated the brinelling problem while preserving and maintaining the original accuracy of the apparatus for a long and useful life.

Although surfaces 18a and 25c may be of any conforming contour so as to distribute the load on a very substantial area instead of a point contact, abutting flat planar surfaces are preferred.

When the flat surfaces 25c in all the support means 14 are substantially coplanar, it is generally desired that the top surfaces of table 11 and fixture plate 13 be generally parallel. Therefore, each generally spherical ball 18 must be accurately ground to identical and exact dimensions as to diameter, as to the distance between the ground flat 18a and the center of the sphere. All of these balls 18 are also of uniform size. Then, this apparatus can be set up by spacer members 30 or 30' in a manner similar to a conventional sine bar wherein the hypotenuse of the triangle is a constant determined by the distance between the respective sphere centers.

Although three or four support means 14 are needed to provide a compound angle between table 11 and plate 13, a simple angle may be provided by only two spaced apart support means 14. Then, the support elements may take the form of spaced apart cylinders instead of generally spherical balls 18 with one of these cylinders 18' being shown in Fig. 5. These two cylinders have parallel axes and with each having a flattened surface 18a' extending along its full length, with the generating elements forming flattened surface and the cylindrical periphery being parallel. Each cylinder would have a circular cross-section, except for the flat portion, with these cross-sections being generally coplanar and forming the plane within which the members would be angularly adjusted.

In Fig. 2, a ball retaining means is provided to normally urge and retain the generally spherical ball 18 in the socket 19a. This takes the form of a resilient O-ring 32 located in an annular groove 19b in the mouth of the socket 19a with this ring 32 bearing against the spherical ball surface on the other side of a great circle opposite from the interior of the socket 19a so as to normally urge and retain the ball 18 in the socket. Of course, the great circle of the generally spherical ball 18 lies in a plane extending through the center of the sphere 18 and is generally shown as being horizontal in Fig. 2, but may take various orientations as members 10 and 12 shift with respect to each other, such as between the solid line and dot-dash line positions in Fig. 2.

Ball ejection means is also associated with each socket interior for ejecting its associated ball 18 from the socket 19a and its ball retaining ring 32. In the present disclosure, this ball ejection means takes the form of an aperture or passageway 33 in fluid communication between the exterior of holder 19 and interior of socket 19a so that fluid pressure, such as air pressure, applied through this aperture or passageway 33 will eject the ball whenever desired. This construction is desirable since the O-ring 32 engages the ball 18 below center (below a great circle) so that the generally spherical ball 18 would be otherwise very difficult to remove from the socket 19a. This passageway or aperture 33 also serves as a vent to remove entrapped air from the socket 19a during insertion of the generally spherical ball 18 so that the ball can be inserted more easily.

Various changes in details and arrangement of parts can be made by one skilled in the art without departing from either the spirit of this invention or the scope of the appended claims.

What I claim is:

1. In combination a lower member, and an upper member resting on said lower member with support means formed therebetween; said support means including a flat surface on one of said members, a support element having a portion circular in cross section with a flat surface on one side bearing against said first mentioned flat surface; said support element being free of attachment to said associated flat surface, the other of said members having a socket for receiving and conforming at least partially to the surface of said circular cross-section, said flat surface on said support element being located remote from the interior of the socket, whereby said support element is self accommodating to the angular orientation between said members with the abutting flat surfaces capable of absorbing substantial load without deformation.

2. In an apparatus for angularly aligning two members relative to each other, comprising a lower member, and an upper member resting on said lower member with at least two spaced apart support means formed therebetween; each support means including a flat surface on one of said members, a support element having a portion circular in cross-section with a flat surface on one side bearing against said first mentioned flat surface, said support element being free of attachment to said associated flat surface, said circular cross-sections on said two support elements being generally coplanar, the other of said members having a socket for receiving and conforming at least partially to the surface of said circular cross-section, said flat surface on said support element being located remote from the interior of the socket, whereby said support elements are self accommodating to the angular orientation between said members with the abutting flat surfaces capable of absorbing substantial load without deformation.

3. In combination, a lower member, and an upper member resting on said lower member with a support means formed therebetween; said support means including a surface on one of said members, a support element having a portion circular in cross section with a surface on one side conforming with and bearing against said first mentioned surface, said support element being free of attachment to said associated flat surface, the other of said members having a socket for receiving and conforming at least partially to the surface of said circular cross section, said surface on said support element being located remote from the interior of the socket, whereby said support element is self accommodating to the angular orientation between said members with the abutting conforming surfaces capable of absorbing substantial load without deformation.

4. In combination, a lower member, and an upper member resting on said lower member with a support means formed therebetween; said support means including a flat surface on one of said members, a generally spherical ball with a flat surface on one side bearing against said first mentioned flat surface, said generally spherical ball being free of attachment to said first mentioned flat surface, the other of said members having a socket for receiving and conforming at least partially to the spherical surface of said ball, said flat surface on said ball being located remote from the interior of the socket, whereby said generally spherical ball is self accommodating to the angular orientation between said members with the abutting flat surfaces capable of absorbing substantial load without deformation.

5. In an apparatus for angularly aligning two members relative to each other, comprising a lower member, and an upper member resting on said lower member with at least two spaced apart support means formed therebetween; each support means including a flat surface on one of said members, a generally spherical ball with a flat surface on one side bearing against said first mentioned flat surface, said generally spherical ball being free of attachment to said first mentioned flat surface, the other of said members having a socket for receiving and conforming at least partially to the spherical surface of said ball, said flat surface on said ball being located remote from the interior of the socket, whereby said generally spherical balls are self accommodating to the angular orientation between said members with the abutting flat surfaces capable of absorbing substantial load without deformation.

6. In an apparatus for angularly aligning two members relative to each other, comprising a lower member, and an upper member resting on said lower member with at least three spaced apart nonlinear support means formed therebetween; each support means including a flat surface on one of said members, a generally spherical ball, the other of said members having a socket for receiving and conforming at least partially to the spherical surface of said ball, whereby said generally spherical balls are self-accommodating to the angular orientation between said members; and spacer means provided for selective insertion or removal between at least two of said balls and the major portion of either associated member to space said members selective different distances apart at said support means having said two balls.

7. In an apparatus, as set forth in claim 6, wherein each generally spherical ball has a flat surface on one side bearing against said first mentioned flat surface.

8. In an apparatus, as set forth in claim 2, wherein spacer means are provided for selective insertion or removal between at least one of said support elements and the major portion of one of said members to space said members a different distance apart at said one support means.

9. In an apparatus, as set forth in claim 2, wherein spacer means are provided for selective insertion or removal between at least one of said support elements and one of said members to space said members a different distance apart at said one support means, said spacer means being insertable between said flat surfaces.

10. In an apparatus, as set forth in claim 2, wherein spacer means are provided for selective insertion or removal between at least one of said support elements and the major portion of one of said members to space said members a different distance apart at said one support means, said one member having a connection to permit relative movement between the flat surface thereon and the major portion thereof so that said spacer means is insertable therebetween.

11. In an apparatus, as set forth in claim 5, wherein said one member has a body portion and a mushroom shaped pin with a shank telescoped into a bore in said body portion, said pin having an enlarged head with said flat surface of said one member formed thereon, and wherein spacer means are selectively insertable over or removable from said shank between said enlarged head and body portion to change the spacing between said head and body portion.

12. In combination, a lower member, and an upper member resting on said lower member with a support means formed therebetween; said support means including a flat surface on the top of said lower member, a generally spherical ball with a flat surface on the bottom side bearing against said first mentioned flat surface, said generally spherical ball being free of attachment to said first mentioned flat surface, the upper of said members having a downwardly extending socket for receiving and conforming at least partially to the spherical surface of said ball, said flat surface on said ball being located remote from the interior of the socket, whereby said generally spherical ball is self accommodating to the angular orientation between said members with the abutting flat surfaces capable of absorbing substantial load without deformation.

13. In combination, a lower member, and an upper member resting on said lower member with a support means formed therebetween; said support means including a flat surface on one of said members, a generally spherical ball with a flat surface on one side bearing against said first mentioned flat surface, said generally spherical ball being free of attachment to said first mentioned flat surface, the other of said members having a socket for receiving and conforming at least partially to the spherical surface of said ball, said flat surface on said ball being located remote from the interior of the socket, and a ball retaining means bearing against the ball surface to retain the ball in the socket.

14. In combination, a lower member, and an upper member resting on said lower member with a support means formed therebetween; said support means including a flat surface on one of said members, a generally spherical ball with a flat surface on one side bearing against said first mentioned flat surface, said generally spherical ball being free of attachment to said first mentioned flat surface, the other of said members having a socket for receiving and conforming at least partially to the spherical surface of said ball, said flat surface on said ball being located remote from the interior of the socket, and a ball retaining means bearing against the spherical ball surface on the other side of a great circle from the interior of said socket to retain the ball in said socket.

15. In combination, a lower member, and an upper member resting on said lower member with a support means formed therebetween; said support means including a flat surface on one of said members, a generally spherical ball with a flat surface on one side bearing against said first mentioned flat surface, said generally spherical ball being free of attachment to said first mentioned flat surface, the other of said members having a socket for receiving and conforming at least partially to the spherical surface of said ball, said flat surface on said ball being located remote from the interior of the socket, and a ball retaining means comprising a resilient ring located in the mouth of said socket and bearing against the spherical ball surface on the other side of a great circle from the interior of said socket to normally urge and retain the ball in said socket.

16. In combination, a lower member, and an upper member resting on said lower member with a support means formed therebetween; said support means including a flat surface on one of said members, a generally spherical ball with a flat surface on one side bearing against said first mentioned flat surface, said generally spherical ball being free of attachment to said first mentioned flat surface, the other of said members having a socket for receiving and conforming at least partially to the spherical surface of said ball, said flat surface on said ball being located remote from the interior of the socket, a resilient ring ball retaining means to retain the ball in said socket, and a ball ejection means associated with the socket interior for ejecting said ball from its associated socket and ball retaining means.

17. In combination, a lower member, and an upper member resting on said lower member with a support means formed therebetween; said support means including a flat surface on one of said members, a generally spherical ball with a flat surface on one side bearing against said first mentioned flat surface, the other of said members having a socket for receiving and conforming at least partially to the spherical surface of said ball, said flat surface on said ball being located remote from the interior of the socket, a ball retaining means to retain the ball in said socket, and ball ejection means associated with the socket interior for ejecting said ball from its associated socket and ball retaining means, said ball ejection means comprising an aperture in said other member in communication with the interior of said socket so that fluid pressure applied through said aperture will eject said ball.

18. In combination, a member, and a generally spherical ball, said member having a socket for receiving and conforming at least partially to the spherical surface of said ball, a ball retaining means comprising a resilient ring located in the mouth of said socket and bearing against the spherical ball surface on the other side of a great circle from the interior of said socket to normally urge and retain the ball in said socket, and ball ejection means associated with the socket interior for ejecting said ball from its associated socket and ball retaining means, said ball ejection means comprising an aperture in said member in communication with the interior of said socket so that fluid pressure applied through said aperture will eject said ball.

19. In combination, a lower member, and an upper member resting on said lower member with a support means formed therebetween; said support means including a flat surface on one of said members, a generally spherical ball with a flat surface on one side bearing against said first mentioned flat surface, the other of said members having a socket for receiving and conforming at least partially to the spherical surface of said ball, said flat surface on said ball being located remote from the interior of the socket, a ball retaining means comprising a resilient ring located in the mouth of said socket and bearing against the spherical ball surface on the other side of a great circle from the interior of said socket to normally urge and retain the ball in said socket, and ball ejection means associated with the socket interior for ejecting said ball from its associated socket and ball retaining means, said ball ejection means comprising an aperture in said other member in communication with the interior of said other socket so that fluid pressure applied through said aperture will eject said ball.

20. In combination, a lower member, and an upper member resting on said lower member with support means formed therebetween; said support means including a flat surface on one of said members, a generally spherical ball with a flat surface on one side bearing against said first mentioned flat surface, the other of said members having a socket for receiving and conforming at least partially to the spherical surface of said ball, said flat surface on said ball being located remote from the interior of the socket, said one member having a body portion and a mushroom shaped pin with a shank telescoped into a bore in said body portion, said pin having an enlarged head with said flat surface of said one member formed thereon, and spacer means selectively insertable over or removable from said shank between said enlarged head and body portion to change the spacing between said head and body portion, whereby said generally spherical ball is self accommodating to the angular orientation between said members with the abutting flat surfaces capable of absorbing substantial load without deformation.

References Cited in the file of this patent

UNITED STATES PATENTS

| | | |
|---|---|---|
| 1,104,891 | Heusser | July 28, 1914 |
| 1,168,727 | Jenigar | Jan. 18, 1916 |
| 1,272,574 | Thomas | July 16, 1918 |
| 2,321,486 | Holt | June 8, 1943 |

FOREIGN PATENTS

| | | |
|---|---|---|
| 337,220 | Germany | May 27, 1921 |
| 581,480 | Germany | July 28, 1933 |